United States Patent
Kapoor (10) Patent No.: US 9,600,221 B2
(45) Date of Patent: Mar. 21, 2017

(54) MULTI-PANE DISPLAY CAPTURE, AGGREGATION, AND SHARING

(75) Inventor: Abhinav Kapoor, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1098 days.

(21) Appl. No.: 11/933,936

(22) Filed: Nov. 1, 2007

(65) Prior Publication Data

US 2014/0028707 A1     Jan. 30, 2014

(51) Int. Cl.
*G06F 3/14*     (2006.01)
*G06F 9/44*     (2006.01)
*G09G 5/14*     (2006.01)

(52) U.S. Cl.
CPC .......... *G06F 3/1454* (2013.01); *G06F 3/1423* (2013.01); *G09G 5/14* (2013.01); *G09G 2340/12* (2013.01); *G09G 2370/025* (2013.01); *G09G 2370/20* (2013.01)

(58) Field of Classification Search
CPC . G06F 3/1454; G06F 9/4445; H04L 12/1813; H04L 65/403; H04L 41/22; H04M 3/567
See application file for complete search history.

(56) References Cited

U.S. PATENT DOCUMENTS

| | | | | |
|---|---|---|---|---|
| 5,353,398 A | * | 10/1994 | Kitahara et al. | 715/759 |
| 5,949,414 A | * | 9/1999 | Namikata et al. | 715/753 |
| 6,329,984 B1 | * | 12/2001 | Boss et al. | 715/723 |
| 7,721,223 B2 | * | 5/2010 | Ben-Shachar et al. | 715/790 |
| 2004/0174319 A1 | * | 9/2004 | Mitsugi et al. | 345/1.1 |
| 2005/0033817 A1 | * | 2/2005 | Wei | 709/208 |
| 2006/0190826 A1 | * | 8/2006 | Montgomery | G06F 3/1454 715/751 |
| 2009/0326979 A1 | * | 12/2009 | Ryan | 705/2 |

* cited by examiner

*Primary Examiner* — Jeffrey Chow
(74) *Attorney, Agent, or Firm* — Shook, Hardy & Bacon L.L.P.

(57) ABSTRACT

Various embodiments herein include one or more of systems, methods, and software for multi-pane display capture, aggregation, and sharing. Some such embodiments include generating an image on a computing device to share with participants in a web conference meeting by capturing a first image of a first graphic display output layer and a second graphic display output layer and removing a portion of the first image. Some embodiments may also include capturing a second image of the second graphic display output layer and combining the first and second images to form a third image. The third image may then be sent to one or more participants of the web conference meeting. The first graphic display output layer may include an overlay pane graphical output of a computing device and the second graphic display output layer may include a standard pane graphical output of the computing device.

16 Claims, 8 Drawing Sheets

MULTI-PANE DISPLAY CAPTURE, AGGREGATION, AND SHARING

BACKGROUND INFORMATION

Web conferencing allows a presenter to share a desktop view from a computer with one or more web conference participants over a network, such as the Internet. There are many providers of web conferencing services using several web conferencing applications that are currently available.

DETAILED DESCRIPTION

Various embodiments described herein include one or more of systems, methods, and software that enable a web conference presenter to share a view of a computer screen with web conference participants without sharing a view of all application user interfaces included within the video output of a presenter's computing device. Some embodiments prevent one or more application user interfaces from being shared in the web conference. Some such embodiments allow a presenter to designate one or more application user interfaces as not to be shared. In a typical embodiment, a user interface control of a web conferencing application is not shared with web conference participants. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Computers today often provide a view of a desktop workspace including two panes that together provide a full image of the desktop workspace. These panes are commonly referred to as a standard, desktop, or base pane and an overlay pane. Most application user interfaces, such as word processing application and web browser application user interfaces, are displayed in the standard pane. The overlay pane currently is not heavily used, but is used by some applications such as by video presentation applications that may provide a full-screen view of video in the overlay pane. The overlay pane is transparent except in locations where user interfaces or other controls are displayed.

Some web conferencing applications provide a user interface in the overlay pane of a presenter. In such applications, the standard pane alone may be shared to keep the shared desktop view from being unnecessarily cluttered or disrupted by the presenter user interface. Other web conferencing applications share both the standard pane and the overlay pane.

Some embodiments, as described below share not only the standard pane, but also the overlay pane. However, such embodiments may be operable to remove one or more user interfaces from the shared overlay pane, such as a web conferencing application user interface. Removing the web conferencing application user interface prevents the shared desktop view from being unnecessarily cluttered by a control that is not a part of a presentation. Also, in some embodiments, the web conferencing application user interface may include a text chat type control to allow the presenter to receive text-based messages from participants. Some messages may include confidential information, or other information, that should not be shared with all web conference participants. Thus, such embodiments that remove the web conferencing application user interface and/or other user interfaces from the desktop view shared with web conference participants allow a presenter to maintain a degree of confidentiality with regard to such user interfaces.

Figure 1:
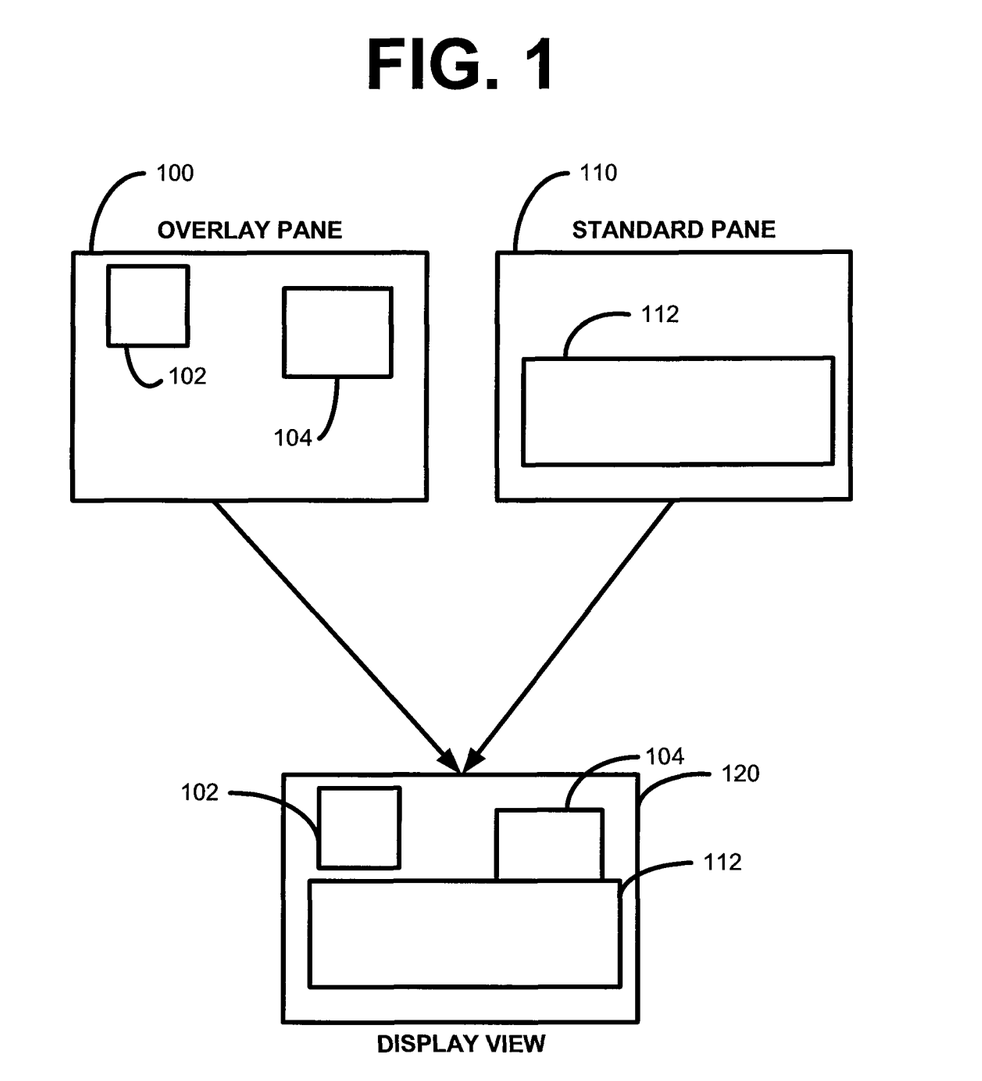
FIG. 1 is an illustration of overlay pane and standard pane views aggregated into a display image for presentation to a computing device user according to an example embodiment.

FIG. 1 is an illustration of overlay pane 100 and standard pane 110 views aggregated into a display image 120 for presentation to a computing device user according to an example embodiment. The overlay pane 100 may include one or more application user interfaces, such as user interfaces 102 and 104. The areas of the overlay pane other than the user interfaces 102 and 104 are transparent. The standard pane 110 typically includes a background image or color within its boundaries and may include one or more application user interfaces, such as user interface 112. The overlay pane 100 and the standard pane 110 are combined by an operating system or graphics card of a computing device to form an aggregated display image 120 for presentation to a computing device user, such as through a monitor. Note that the aggregated display image 120 includes the user interfaces 102 and 104 of the overlay pane 100 and the user interface 112 of the standard pane 110. The overlay pane 100, being transparent except in the locations where the user interfaces 102 and 104 are located, allows viewing of the user interface 112 and the background of the standard pane 110.

Figure 2A:
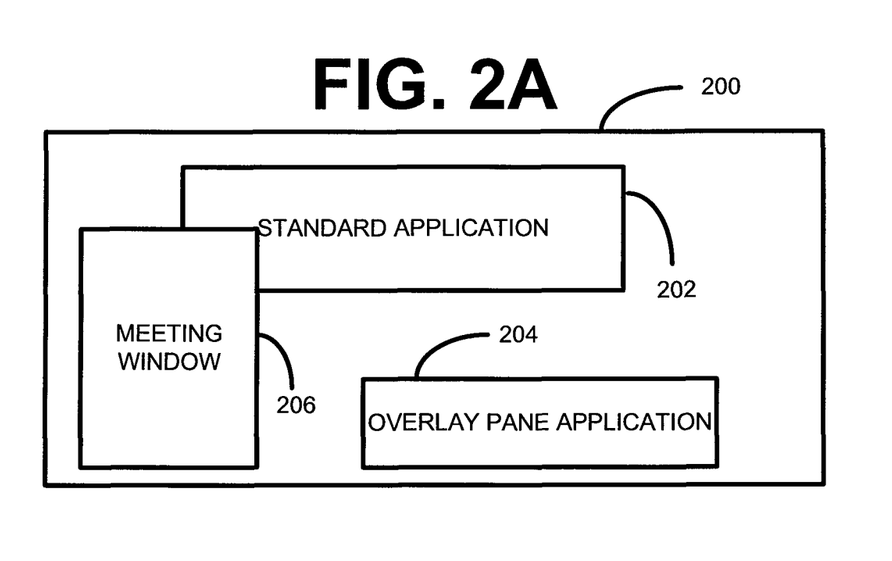
FIG. 2A is an aggregated display image for presentation to a computing device user according to an example embodiment.

FIG. 2A is an aggregated display image 200 for presentation to a computing device user according to an example embodiment. The aggregated display image 200 includes a standard application user interface 202, such as a slide presentation type application, from the standard pane, and user interfaces from other applications, such as a web conferencing application meeting window user interface 206 in the overlay pane and another overlay pane application user interface 204.

In example embodiments, a computing device generating the aggregated display image 200 generates the standard pane image separately from the overlay pane image and then overlays the overlay pane image on top of the standard pane image. The overlay pane image may be overlaid upon the standard pane image utilizing one or both of operating system functions and graphical output generation circuit functions, such as functions of a graphics card.

Figure 2B:
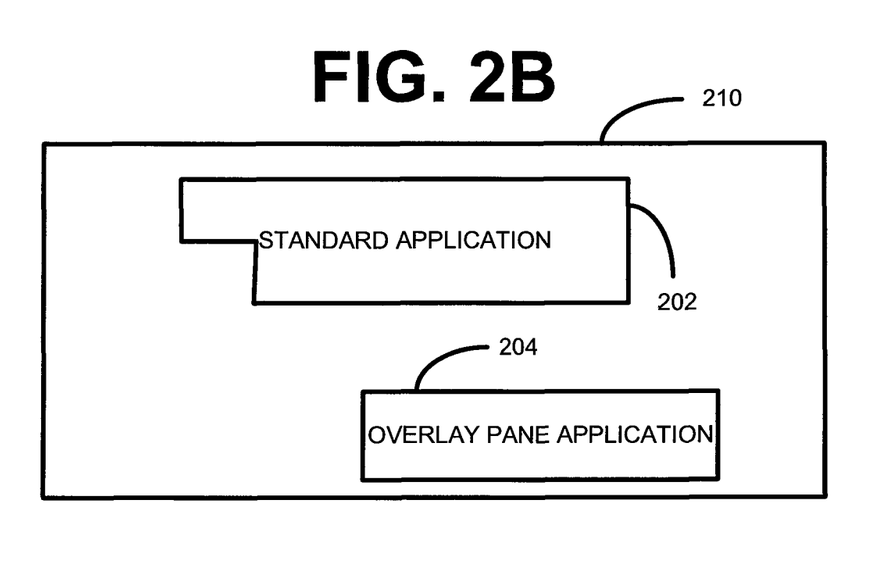
FIG. 2B is a captured image of an overlay pane according to an example embodiment.

FIG. 2B is a captured image 210 of both the overlay pane and the standard pane according to an example embodiment. However, the web conferencing application meeting window user interface 206 has been removed from the captured image 210. Remaining in the captured image 210 is the other overlay pane application user interface 204 and the standard application 202 with a portion missing where the web conferencing application meeting window user interface 206 was removed. The web conferencing application meeting window user interface 206 has been removed from the captured image 210 to prevent its inclusion in images shared with web conference participants. In some such embodiments, the web conferencing application may capture the image 210 and remove the web conferencing application meeting window user interface 206. The area where the web conferencing application meeting window user interface 206 is removed may be made transparent. The web conferencing application may then capture an image of just the standard pane, such as is illustrated in FIG. 2C, and overlay the captured image 210, as modified, on top of the standard pane image to generate and aggregated desktop images to be shared with web conference participants.

Figure 2C:
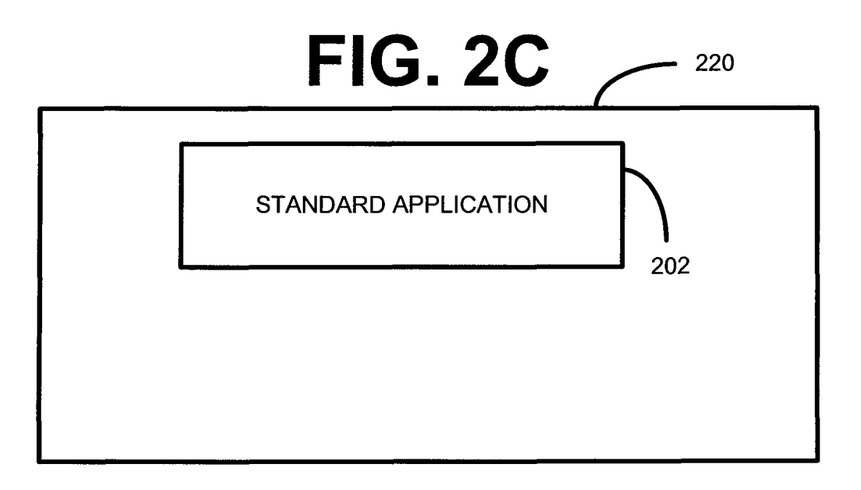
FIG. 2C is a captured image of a standard pane according to an example embodiment.

FIG. 2C is a captured image 220 of a standard pane according to an example embodiment. The standard pane captured image 220 includes the standard application user interface 202 and a background image or color.

In some embodiments, the captured images 210 and 220 are captured by on a web conference presenter's computing device by making a call to an application programming interface ("API") of an operating system. The API call may include making a Microsoft Windows API call to obtain an image to be captured. An example of such an API is the BITBLT API in modern Microsoft Windows operating system.

Figure 2D:
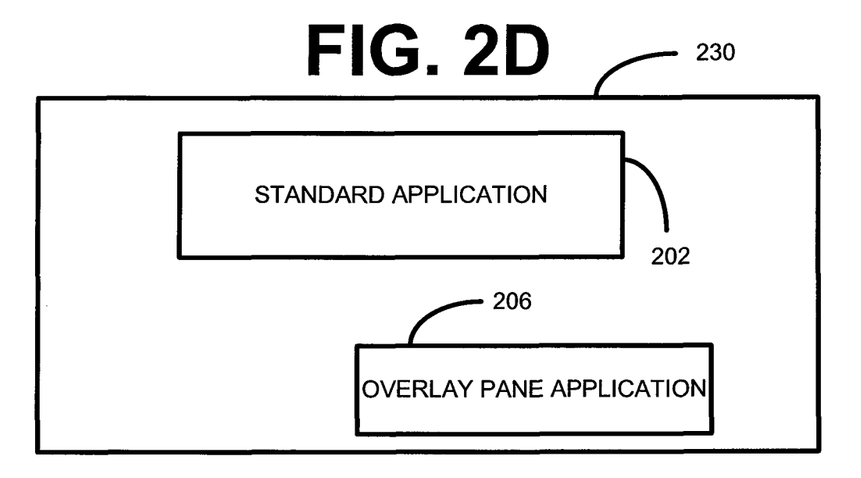
FIG. 2D is an aggregated image including a modified captured overlay pane image aggregated with the captured standard pane image according to an example embodiment.

FIG. 2D is an aggregated image 230 including a modified captured image 210 of both the overlay pane and the standard pane aggregated with the captured standard pane image 220 according to an example embodiment. The aggregated image 230 includes the overlay pane application user interface 204 overlaid on top of the standard pane captured image 220 which includes the standard application user interface 202. Note that the standard application 202 is fully visible in the aggregated image 230 due to the transparent nature of the space in the captured image 210 of FIG. 2B where the web conferencing application meeting window user interface 206 was removed. The aggregated image 230 may then be shared with web conference participants over a network. More detail as to how a web conferencing application according to some of the various embodiments is provided below with reference to FIG. 3.

Figure 3:
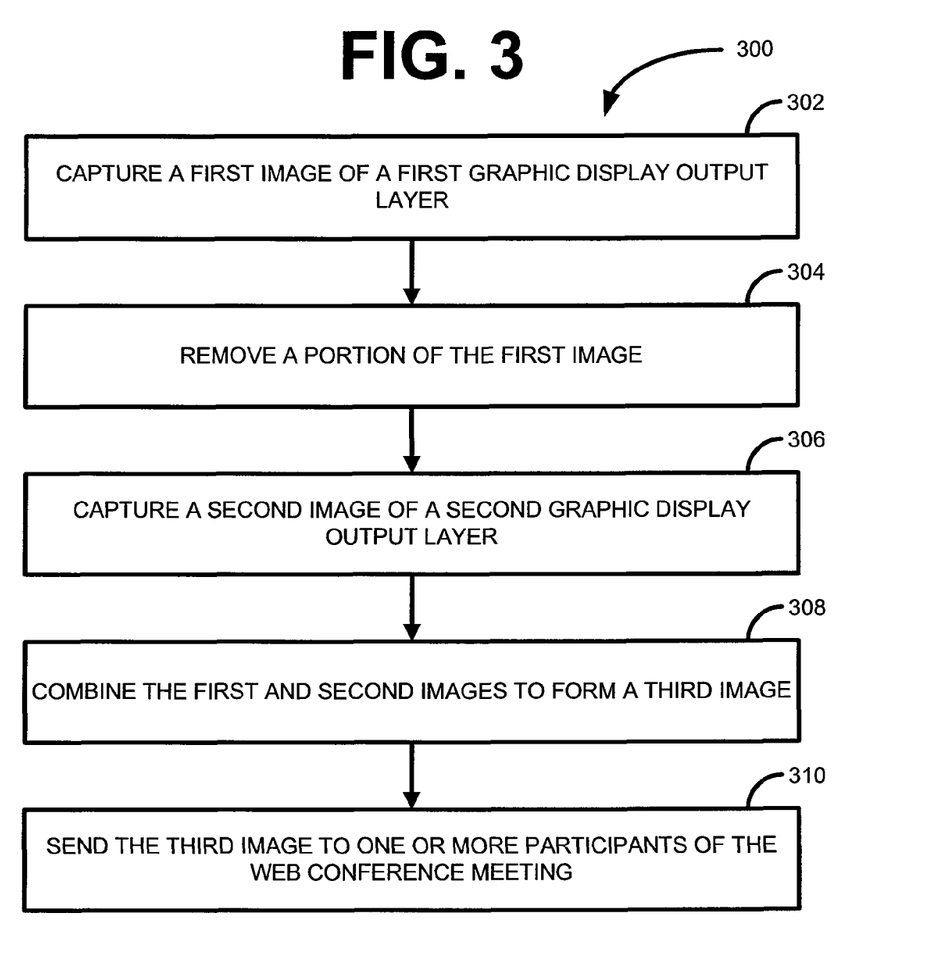
FIG. 3 is a block flow diagram of a method according to an example embodiment.

FIG. 3 is a block flow diagram of a method 300 according to an example embodiment. The example method 300 is a method of generating an image on a computing device to share with participants in a web conference meeting. The method 300 typically includes capturing 302 a first image of a first graphic display output layer and second graphic display output layer and removing 304 a portion of the first image. The method 300 further includes capturing 306 a second image of a second graphic display output layer and combining 308 the first and second images to form a third image. The method 300 may further include sending 310 the third image to one or more participants of the web conference meeting.

The first graphic display output layer, in some embodiments of the method 300, is the graphic display output including the overlay pane. Thus the second graphic display output layer, in such embodiments, is the standard layer. Although this is a typical embodiment, there is no requirement that the first and second layer are the only layers output by a computing device that may be processed utilizing the method or that the overlay pane be the first graphic display output layer and the standard pane be the second graphic display output layer. Some embodiments may include three or more layers processed individually by expanded embodiments of the method 300 for processing each of the three or more layers.

In some embodiments, the portion removed 304 from the first image may be a portion of the first image associated with a graphical user interface control of a web conferencing application. The removal 304 may be performed by a process within such a web conferencing application that is aware of the position of the graphical user interface control of the web conferencing application within the first captured 302 image. In other embodiments, such a process may obtain location information of a user interface to be removed from the first captured 302 image by making a call to an application programming interface of an application to which the user interface belongs, or is otherwise associated with, or of an operating system.

Removing 304 the portion of the first image may include identifying a portion of the first image associated with a first application, such as a web conferencing application or other application that contributes to the captured 302 first image, and removing the portion of the first image associated with the first application.

In some embodiments of the method 300, sending 310 the third image to one or more participants of the web conference meeting includes sending the third image to a web conferencing server to be distributed to each of the one or more participants of the web conference meeting. The sending 310 of the third image to the server or directly to the one or more participants of the web conference meeting is typically performed several times per second. Thus, in such embodiments, the method 300 is performed to generate and send 310 the third image to the one or more participants of the web conference meeting several times per second. The rate at which the method 300 is performed may be at a rate equal to a frame-per-second rate at which a web conferencing application provides images to the one or more participants of the web conference meeting. The frame-per-second rate is may be virtually any rate, such as a rate between two and eight frames-per-second, nine or ten frames-per-second, or more but may be virtually any rate that is supported by the computing resources available to perform the method 300.

Although the user interfaces within the overlay pane have been illustrated in FIG. 2A, FIG. 2B, and FIG. 2D as non-overlapping, this may not always be the case. In some embodiments, overlapping of user interfaces in the overlay pane may be identified before images are captured for a web conference. In such embodiments, user interface locations may be identified and processed in view of one another, such as by comparing X and Y coordinates of the user interfaces within the overlay pane. If user interfaces are found to overlap, a process may causes one or more of the user interfaces to be relocated to remove the overlapping. In other embodiments, the web conferencing application may request that the user interfaces be relocated before starting the web conference image capturing. However, some embodiments may include methods, such as method 500 of FIG. 5, to handle overlapping of user interfaces. An example illustration of how user interfaces may overlap within the overlay pane is illustrated in FIG. 4A and how such overlapping may be handled is illustrated in FIG. 4B and FIG. 4C.

Figure 4A:
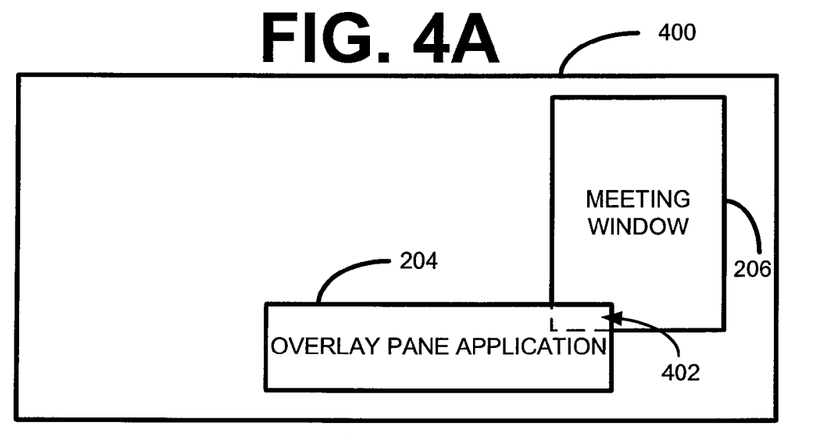
FIG. 4A-C illustrate captured image processing according to an example embodiment.
Figure 4B:
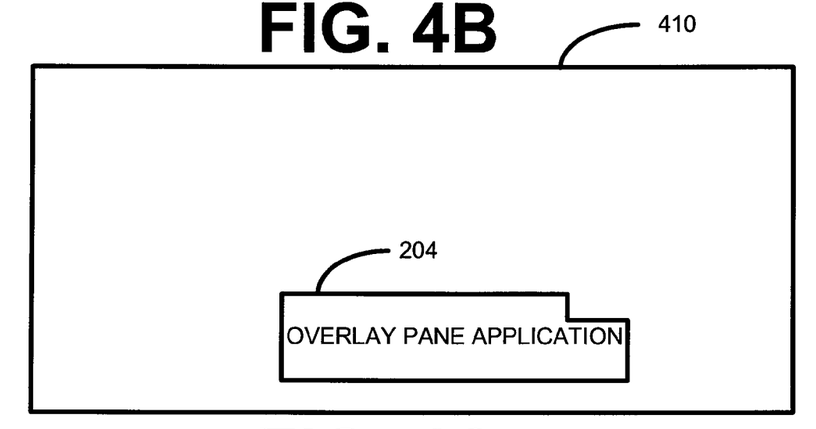
Figure 4C:
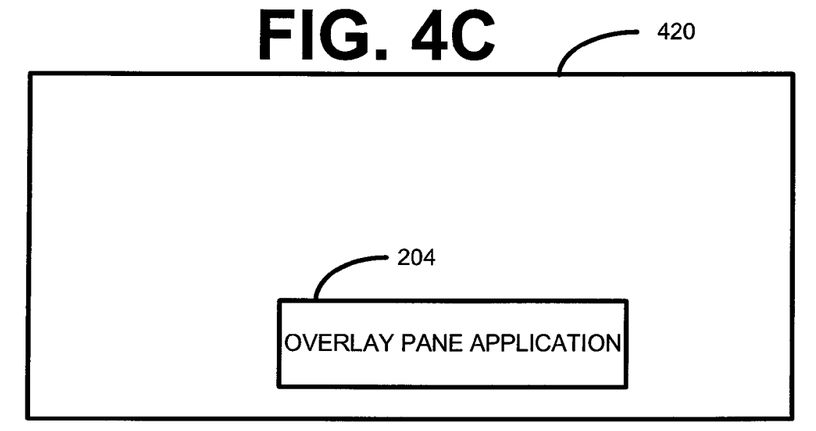

FIG. 4A-C illustrate captured image processing according to an example embodiment. FIG. 4A illustrates a captured image 400 according to an example embodiment. Although the captured image 400 is illustrated as only including windows 204 and 206 from the overlay pane, the captured image 400 may also include elements from the standard pane. Such elements are omitted from the image 400 for the sake of keeping the figure simple.

Figure 5:
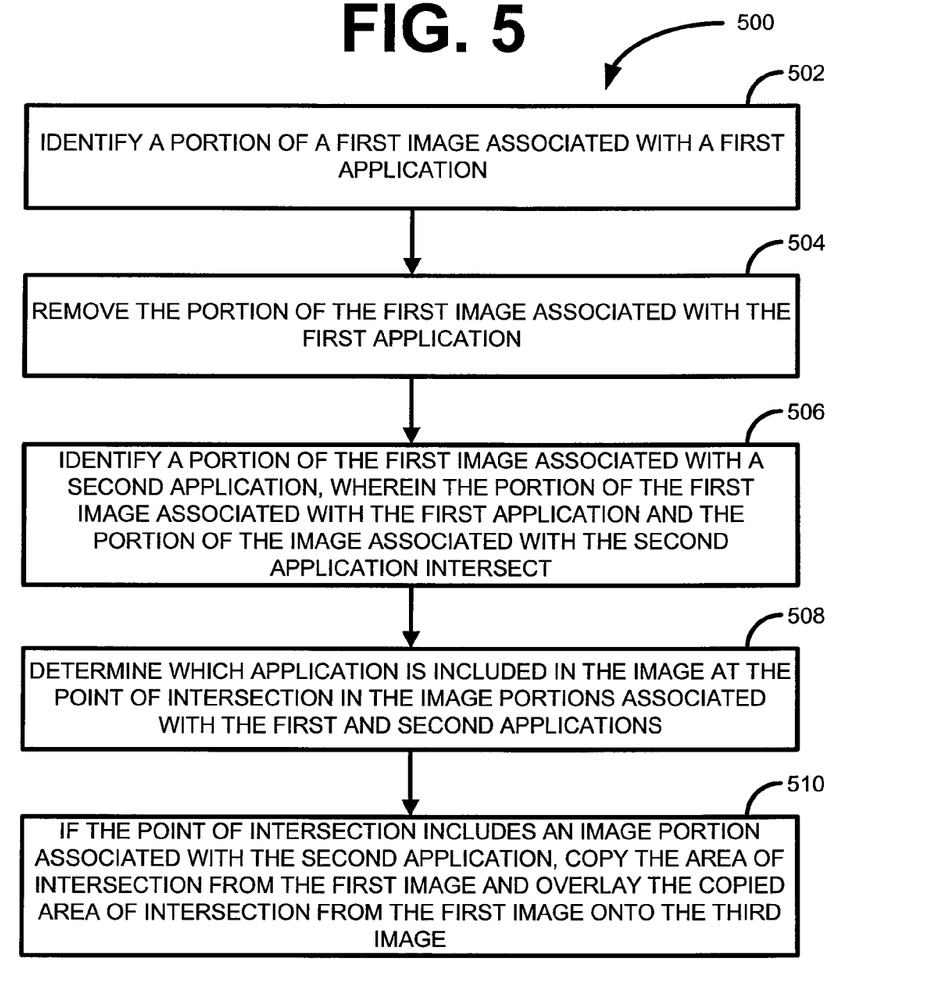
FIG. 5 is a block flow diagram of a method according to an example embodiment.

The captured image 400 includes the web conferencing application meeting window user interface 206 and the other overlay pane application user interface 204 as described above. However, the captured image 400 includes an intersection area 402 where the web conferencing application meeting window user interface 206 and the other overlay pane application user interface 204 overlap. When the captured image 400 is processed to remove the web conferencing application meeting window user interface 206, such as according to method 300 illustrated and described with regard to FIG. 3, the intersection area 402 is also removed as illustrated in the modified image 410 of FIG. 4B. In such instances, where the user interface that is not removed from the captured image 400 is located on top of the user interface to be removed, the intersection area 402 may be copied from the captured image 400 and placed back within the modified image 420 as illustrated in FIG. 4C. FIG. 5 provides further detail as to a method of processing captured images in such instances.

FIG. 5 is a block flow diagram of a method 500 according to an example embodiment. The method 500 is described below with reference to FIG. 4A and FIG. 4C. In a typical embodiment, the method 500 may include identifying 502 a portion 206 of a first image 400 associated with a first application and removing 504 the portion 206 of the first image 400 associated with the first application. The method 500 further includes identifying 506 a portion 204 of the first image 400 associated with a second application, wherein the portion 206 of the first image 400 associated with the first application and the portion 204 of the image 400 associated with the second application intersect 402. The method 500 also includes determining 508 which application is included in the image 400 at the point of intersection 402 in the image 400 portions 204 and 206 associated with the first and second applications. If the point of intersection 402 includes an image portion associated with the second application, copying 510 the area of intersection 402 from the first image 400 and overlaying the copied area of intersection 402 from the first image 400 onto the third image 420.

In some further instances, rather than a user interface to remain in the modified image being on top of a user interface to be removed, the user interface to be removed may be on top. Such instances may be handled in some embodiments by maintaining a cached image copy of the user interface that is to remain in the modified image. Thus, a missing portion of the user interface that is to remain in the modified image may be copied from the cached copy and overlaid into the modified image. However, as mentioned above, different embodiments may include automatically moving or prompting a user to move the user interfaces in the overlay pane to prevent such a scenario from occurring.

Figure 6:
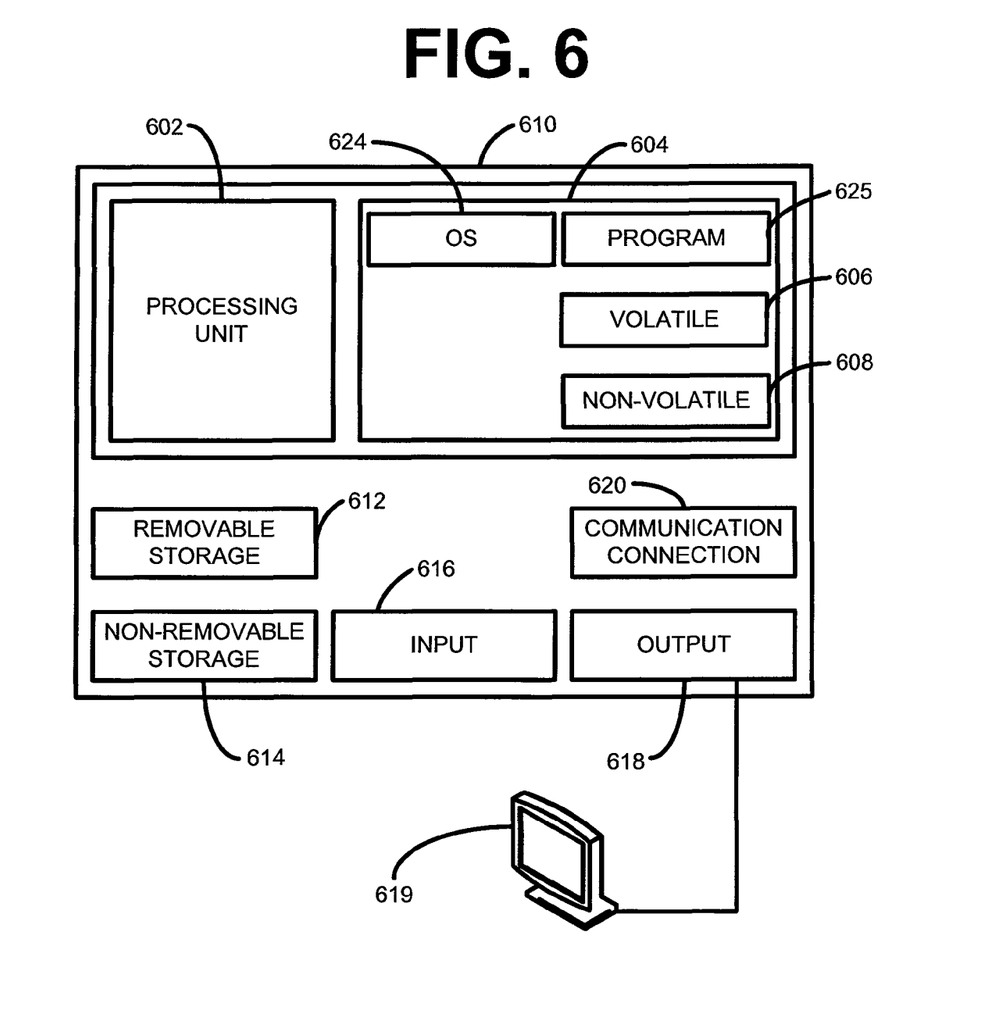
FIG. 6 is a block diagram of a computing device according to an example embodiment.

FIG. 6 is a block diagram of a computing device according to an example embodiment. In one embodiment, multiple such computer systems are utilized in a distributed network to implement multiple components in a transaction-based environment. An object oriented, service oriented, or other architecture may be used to implement such functions and communicate between the multiple systems and components. One example computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The output 618 may include a graphics circuit, such as a graphics card, capable of generating signals in response to operations of the computer 610 that cause a monitor 619 to display a visual representation of user interfaces that allow users to interact with processes of a program 625 and an operating system 624. The computer 610 may operate in a networked environment using the communication connection 620 to connect to one or more remote computers, such as database servers, web conferencing servers, web conference participant clients, and other remote devices and computers over a network. A remote computer may include a personal computer (PC), server, router, network PC, a peer device or other common network node, or the like. The communication connection may include one or more of a Local Area Network (LAN), a Wide Area Network (WAN), the Internet, and other networks.

Computer-readable instructions stored on a computer-readable medium are executable by the processing unit 602 of the computer 610. A hard drive, CD-ROM, and RAM are some examples of articles including a computer-readable medium. The computer instructions on the computer-readable medium may include instructions of a computer program 625 capable of performing one or more of the methods described above. In some embodiments, the computer program 625 is a web conferencing application that may be used by a presenter of a web conference.

Figure 7:
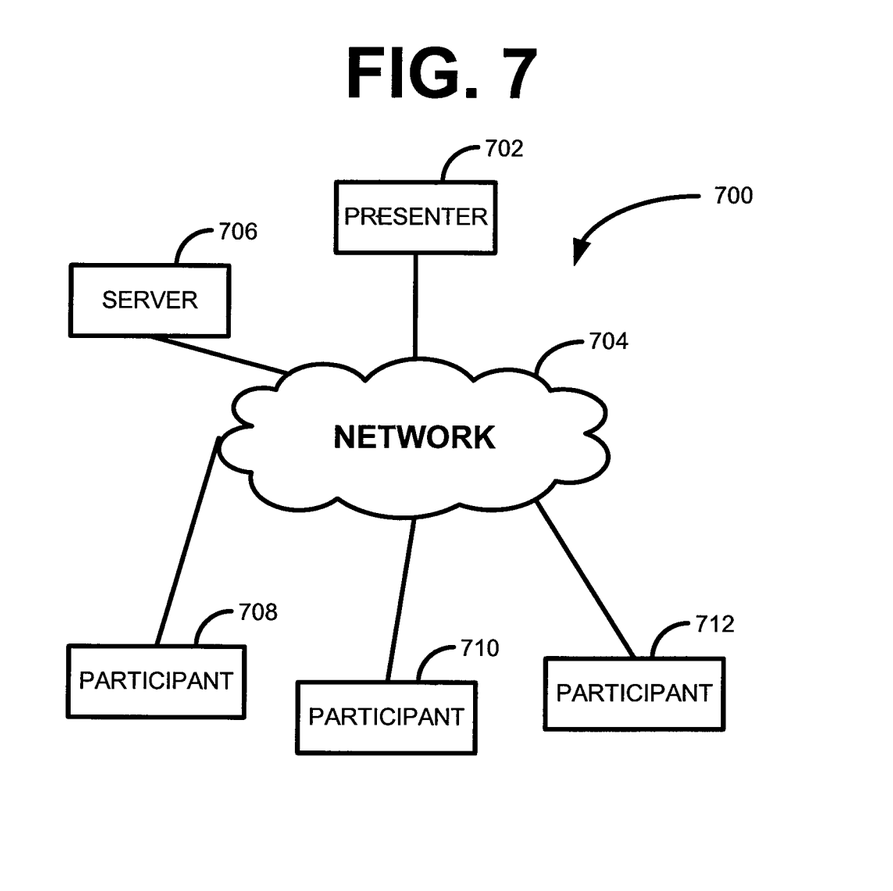
FIG. 7 is an illustration of a system according to an example embodiment.

FIG. 7 is an illustration of a system 700 according to an example embodiment. The system 700 is a typical arrangement of computing devices on a network that may participate in a web conference. The system 700 includes a presenter computing device 702, a web conferencing server 706, and participant computing devices 708, 710, 712 interconnected via the network 704. Although a single presenter computing device 702 is illustrated, the role of presenter may be filled or shared amongst more than one computing device. Also, any number of participants may be included in a web conference. The server 706 is an example of a web conferencing server 706 that may be utilized to receive presentation signals from the presenter computing device 702 and provide the presentation signals to each of the participant computing devices 708, 710, 712 connected to the web conferencing server 706 over the network 704. In some embodiments, the presenter computing device 702 may provide presentation signals over the network 704 to the participant computing devices 708, 710, 712 without utilizing the web conferencing server 706.

Some further embodiments provide a system including one or more video output modules operable to generate video output from the system including a standard pane and an overlay pane. The system may further include a network interface and a web conferencing module operable to share video output from the one or more video output modules with web conference meeting participants over the network interface. The web conferencing module is typically operable to capture a first image of both the overlay pane and the standard pane and remove a portion of the capture first image. The web conferencing module may be further operable to capture a second image of only the standard pane output by the one or more video output modules and combine the first and second images to form a third image. The third image may then be sent to the web conference meeting participants over the network interface.

Another embodiment provides a computer-readable medium, with instructions thereon, which when executed, cause a computer to capture a first image of both the overlay pane and standard pane generated by one or more video output modules of a computer and delete a portion of the first image so as to make the deleted portion of the first image transparent. The instructions may be further operable to capture a second image of a second graphic display output layer and combine the first and second images to form a third image to be shared with one or more participants of the web conference meeting.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of generating an image on a presenter's computing device to share with participants in a web conference meeting, the method comprising:
   at a rate of at least once per second in the web conference meeting:
   capturing a first image by combining a first graphic display output layer and a second graphic display output layer of a first current user interface of the presenter's computing device, wherein:
      (i) the first graphic display output layer is an overlay pane that is transparent except in locations where user interfaces and controls are displayed within the first graphic display output layer; and
      (iii) the second graphic display output layer is a standard pane;
   removing a portion of the first image corresponding to locations where the controls are displayed within the first graphic display output layer that is the overlay pane;
   subsequent to capturing the first image, capturing a second image consisting of the second graphic display output layer that is the standard pane of a second current user interface of the presenter's computing device, the second image including an unobscured view of the second graphic display output layer of the second current user interface at locations corresponding to the portion removed from the first image, the second image being different from the first image;
   combining the first image after removing the portion and the second image to form a third image, the second image providing at least the unobscured view of the second graphic display output layer of the second current user interface at locations corresponding to the portion removed from the first image; and
   sending the third image to one or more participants of the web conference meeting.

2. The method of claim 1, wherein the sending of the third image to one or more participants of the web conference meeting includes sending the third image to a web conferencing server to be distributed to each of the one or more participants of the web conference meeting.

3. The method of claim 1, wherein the removing of the portion of the first image includes removing a specific portion of the first image associated with a graphical user interface control of a web conferencing application.

4. The method of claim 1, wherein the removing of the portion of the first image includes:

identifying a first portion of the first image as being associated with a first application; and removing the first portion of the first image associated with the first application.

5. The method of claim 4, further comprising:

identifying a second portion of the first image as being associated with a second application, wherein the first portion of the first image associated with the first application and the second portion of the image associated with the second application intersect;

determining which of the first and second applications is included in the first image at an area of intersection in the first and second image portions associated respectively with the first and second applications;

copying the area of intersection from the first image and overlaying the area of intersection from the first image onto the third image when the area of intersection includes an image portion associated with the second application.

6. The method of claim 1, including generating and sending the third image to the one or more participants of the web conference meeting at a rate equal to a frame-per-second rate at which a web conferencing application provides images to the one or more participants of the web conference meeting.

7. A system comprising:

one or more video output modules operable to generate video output from the system including a standard pane and an overlay pane, wherein the overlay pane is transparent except in locations where user interfaces and controls are displayed within the overlay pane;

a network interface; and a web conferencing module operable to share video output from the one or more video output modules with web conference meeting participants over the network interface, the web conferencing module operable, at a rate of at least once per second, to:

capture a first image by combining the standard pane and the overlay pane of a first current user interface of the presenter's computing device;

remove a portion of the first image corresponding to locations where the controls are displayed within the overlay pane;

subsequent to capture of the first image, capture a second image consisting of the standard pane of a second current user interface of the presenter's computing device, the second image including an unobscured view of the standard pane of the second current user interface at locations corresponding to the portion removed from the first image combine the first image after removal of the portion and the second image to form a third image, the second image providing at least the unobscured view of the standard pane of the second current user interface at locations corresponding to the portion removed from the first image; and send the third image to the web conference meeting participants over the network interface.

8. The system of claim 7, wherein the portion removed from the first image is associated with a graphical user interface control of the web conferencing module.

9. The system of claim 8, wherein the portion of the image removed from the first image further includes a user interface displayed within the overlay pane associated with an application other than the web conferencing module.

10. The system of claim 7, wherein the web conferencing module is configurable to send the third image to a web conferencing server over the network interface.

11. The system of claim 7, wherein the web conferencing module is operable to:

identify one or more additional portions of the first image associated with one or more user interfaces configured to be excluded from the third image; and remove the one or more additional portions of the first image associated with the one or more user interfaces configured to be excluded from the third image.

12. A non-transitory computer-readable medium, with instructions thereon, which when executed, cause a computer to:

at a rate of at least once per second in a web conference meeting:

capture a first image by combining a first pane and a second pane generated by one or more video output modules of a computer, the first pane and the second pane corresponding to a first current user interface of the computer, wherein:

(i) the first pane is an overlay pane that is transparent except in locations where user interfaces and controls are displayed within the first pane; and (ii) the second pane is a standard pane;

delete a portion of the first image corresponding to the locations where the controls are displayed within the first pane that is the overlay pane and make the deleted portion of the first image transparent;

subsequent to capture of the first image, capture a second image consisting of the second pane that is the standard pane of a second current user interface of the computer, wherein the second image includes an unobscured view of the second pane of the second current user interface at locations corresponding to the portion that was deleted from the first image; and combine the first image after deletion of the portion and the second image to form a third image, the second image providing at least the unobscured view of the second pane of the second current user interface at the locations corresponding to the portion deleted from the first image, the third image to be shared with one or more participants of the web conference meeting.

13. The non-transitory computer-readable medium of claim 12, with further instructions thereon, which when executed, cause the computer to:

send the third image over a network to one or more participants of a web conference meeting via a web conferencing server.

14. The non-transitory computer-readable medium of claim 12, wherein the deleting of the portion of the first image includes:

identifying a first portion of the first image associated with a first application; and deleting the first portion of the first image associated with the first application.

15. The non-transitory computer-readable medium of claim 14, with further instructions thereon, which when executed, cause the computer to:

identify a second portion of the first image associated with a second application, wherein the first portion of the first image is associated with the first application and the second portion of the image is associated with the second application intersect;

determine which of the first and second applications is represented in the image at the point of intersection in the first and second portions of image associated respectively with the first and second applications;

copy the area of intersection from the first image and overlay the area of intersection onto the third image when the area of intersection includes an image portion associated with the second application.

16. The non-transitory computer-readable medium of claim 12, with further instructions thereon, which when executed, cause the computer to generate the third image at a rate specified by a configuration setting of a web conference meeting.

* * * * *

UNITED STATES PATENT AND TRADEMARK OFFICE
CERTIFICATE OF CORRECTION

| | | |
|---|---|---|
| PATENT NO. | : 9,600,221 B2 | Page 1 of 1 |
| APPLICATION NO. | : 11/933936 | |
| DATED | : March 21, 2017 | |
| INVENTOR(S) | : Abhinav Kapoor | |

It is certified that error appears in the above-identified patent and that said Letters Patent is hereby corrected as shown below:

In the Specification

Column 01, Line 31: Please remove "FIG." and replace with --FIGS.--.
Column 05, Line 36: Please remove "FIG." and replace with --FIGS.--.

In the Claims

Column 08, Line 34: Please remove "(iii)" and replace with --(ii)--.

Signed and Sealed this
Twenty-second Day of October, 2019

Andrei Iancu
*Director of the United States Patent and Trademark Office*